W. S. BARTLE.
Rotary-Valves and Cut-offs.
No. 141,982. Patented August 19, 1873.
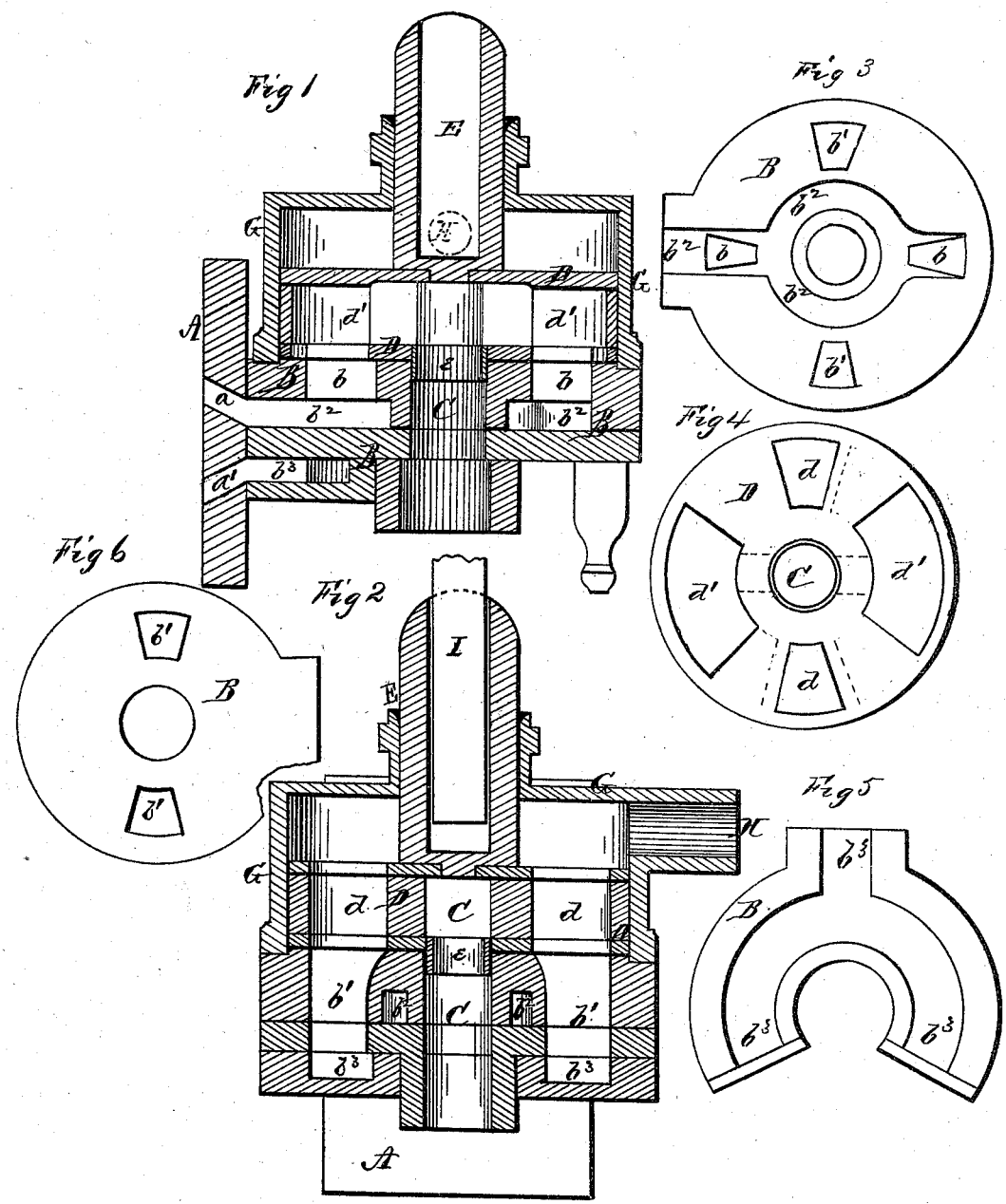

UNITED STATES PATENT OFFICE.

WARREN S. BARTLE, OF NEWARK, NEW YORK.

IMPROVEMENT IN ROTARY VALVES AND CUT-OFFS.

Specification forming part of Letters Patent No. 141,982, dated August 19, 1873; application filed June 25, 1873.

*To all whom it may concern:*

Be it known that I, WARREN S. BARTLE, of Newark, in the county of Wayne and in the State of New York, have invented certain new and useful Improvements in Rotary Valve and Cut-Off; and do hereby declare that the following is a full, clear, and exact description thereof, reference being had to the accompanying drawings and to the letters of reference marked thereon, making a part of this specification.

The nature of my invention consists in the construction and arrangement of a rotary valve and cut-off, as will be hereinafter more fully set forth.

In order to enable others skilled in the art to which my invention appertains to make and use the same, I will now proceed to describe its construction and operation, referring to the annexed drawing, in which—

Figures 1 and 2 are vertical sections of my valve, and Figs. 3, 4, 5, and 6 show the various parts of which the valve is composed.

A represents a plate, provided with two apertures, $a$ $a'$, and is to be fastened near the center of the cylinder, in which there should be corresponding apertures running each way to the ends. On the outer side of this plate A is secured the circular valve-seat B, which is provided with four ports or apertures, $b$ $b$ and $b^1$ $b^1$, at equal distances apart, and arranged in circular form, as shown in Fig. 3. The two ports $b$ $b$ open in a channel, $b^2$, formed in the valve-seat, and communicate with the aperture $a$ in the plate A. The other two ports, $b^1$ $b^1$, open into another channel, $b^3$, also formed in the valve-seat, and communicating with the aperture $a'$ in said plate A. D represents the rotating valve, which is provided with two inlet-ports, $d$ $d$, and two exhaust-ports, $d'$ $d'$, the latter ports communicating with the center outlet C, as shown in Figs. 1 and 4. The bearing for the valve is formed by a stem, E, attached to the valve, and passing through the head of the casing or steam-chest G which surrounds the valve. H represents the steam-inlet into the casing or steam-chest G.

By arranging four ports or apertures in the valve-seat B, as described, I am enabled to accomplish the same results with one-half the length of openings, lessening the diameter of the valve nearly one-half and the speed just one-half, so that when my valve makes one revolution the engine makes two, they being connected by bevel-wheels that run two to one, the largest being on the spindle I that drives the valve. The end of this spindle is square, and inserted loosely in a square hole made in the end of the stem E, thus allowing the spindle to slide out and in, as occasion may require. From various causes this spindle I may become extended or contracted, whereby, if connected by a fixed coupling, an undue pressure is brought upon the valve, or the valve might be lifted from the seat. This is entirely obviated by the sliding joint described.

The two ports in the valve-seat, which have the same communication with the end of the cylinder, are placed opposite each other, whereby the pressure is made equal on both sides of the valve. The valve having double openings for the admission and exhaustion of the steam, the whole pressure may be taken from the valve, if necessary, by enlarging the stem E, without having to contend with the dip or digging movement, as is the case with a rotary valve having only one aperture, while passing the port in the seat.

By the double cut-off in combination with the circular valve I am enabled to use the steam expansively, and, at the same time, retain the equilibrium of the valve.

By running the circular valve at a less speed than the engine the friction is overcome and the durability of the parts materially increased.

Having thus fully described my invention, what I claim as new, and desire to secure by Letters Patent, is—

The combination of the valve-seat B with ports $b$ $b$ and $b^1$ $b^1$ and passages $b^2$ $b^3$, the valve D with ports $d$ $d$ and $d'$ $d'$, the stem E, spindle I, and chest G with inlet H and outlet C, all constructed and arranged substantially as and for the purposes herein set forth.

In testimony that I claim the foregoing I have hereunto set my hand this 11th day of June, 1873.

WARREN S. BARTLE.

Witnesses:
JOEL H. PRESCOTT,
CHAS. H. PERKINS.